Nov. 29, 1938.　　　P. M. RAIGORODSKY　　　2,138,218
METHOD OF RECOVERING HYDROCARBONS
Filed Sept. 4, 1936
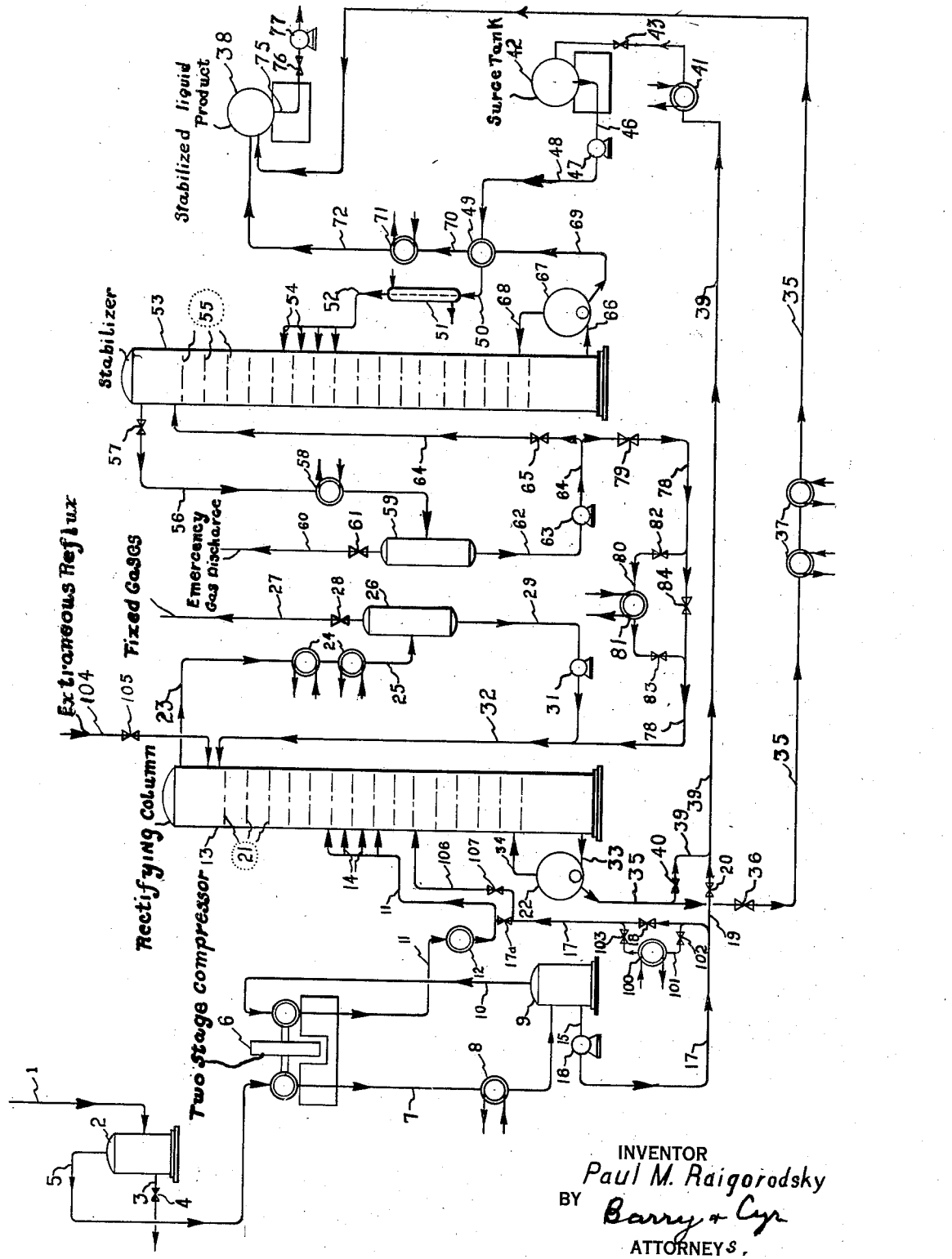
INVENTOR
Paul M. Raigorodsky
BY
ATTORNEYS.

Patented Nov. 29, 1938

2,138,218

UNITED STATES PATENT OFFICE 2,138,218

METHOD OF RECOVERING HYDROCARBONS

Paul M. Raigorodsky, Tulsa, Okla., assignor to Petroleum Engineering Inc., Tulsa, Okla.

Application September 4, 1936, Serial No. 99,482

14 Claims. (Cl. 196—7)

The present invention relates to a method of recovering useful hydrocarbons from gaseous materials such as natural gas, casinghead gas, vapors and/or gases such as are obtained from natural gasoline, refinery cracking plants and crude distillation processes, coal tar distillation processes, hydrocarbon polymerization processes and from any other vapors and/or gases which contain such useful hydrocarbons.

This invention relates particularly to improvements in the so-called "vapor rectification" process, one form of which was originally described in my Patent No. 1,977,087, dated October 16, 1934, wherein was disclosed the application of the "vapor rectification" process particularly to the recovery of useful hydrocarbons contained in the vapors and gases from pressure distillate such as is derived from the cracking of petroleum.

A principal object of my present invention is to provide various improvements in the "vapor rectification" process whereby this process may be applied generally to the recovery of useful hydrocarbons from variously derived vapors and/or gases.

By "vapor rectification" process, I refer to that type of process wherein vapors and/or gases, from which useful hydrocarbons are to be recovered, are compressed, and the resulting compressed fluid, before removal of any of the constituents of the original charge from the process, is subjected to a rectification step, so controlled, that substantially all of the useful hydrocarbons will be recovered therefrom, while only undesirable hydrocarbons will then be discharged from the process.

In the modification of the "vapor rectification" process described in my patent, No. 1,977,087, the process comprises the following steps:

1. Compression of the vapors and gases in a plurality of stages of increased compression,
2. Cooling of the vapors and gases after each compression stage,
3. Separation of condensates resulting from each stage of compression and cooling,
4. Mixing of the vapors and gases from the final compression stage with said condensates,
5. Rectification of the resulting mixture to recover desirable hydrocarbons from the mixture, and
6. Stabilization of the recovered desirable hydrocarbons.

In the previously patented modification, steps 5 and 6 are conducted simultaneously in a single rectifying column.

In accordance with the aforementioned general object, my present invention consists in providing, in "vapor rectification" processes, improvements such as the following:

Regulated control of the temperature of the vapors and/or gases leaving the final compression stage and prior to introduction thereof into the rectification zone.

Increasing the recovery of desirable constituents from the vapors and/or gases being rectified by varying the composition of the reflux made in the rectification zone by enriching same with undesirable constituents.

Combinations of these improvements with other steps of "vapor rectification" processes to improve the efficiency of such processes.

These and other advantages and objects of my new invention will become apparent from the following detailed description read in conjunction with the attached drawing which diagrammatically illustrates one form of apparatus which may be used in practicing my improved process.

Referring to the drawing, a gaseous charge comprising vapors and/or gases from one or more of the above mentioned sources, and containing useful hydrocarbons to be recovered therefrom, is introduced into the recovery system through a pipe 1 which leads into a scrubber 2, wherein any liquid or other undesired particles entrained in said gaseous charge may be removed therefrom and discharged from the system via a pipe 3 by opening a valve 4 mounted in pipe 3. The scrubbed gaseous charge then passes from scrubber 2 through a pipe 5 into the first stage or low-pressure side of a compressor 6, wherein the gaseous charge is compressed to a relatively low pressure and discharged therefrom via a pipe 7 which passes through a cooler 8 in which the compressed material is cooled and passes thence into a scrubber 9 wherein any condensate resulting from the described compressing and cooling operation is separated from uncondensed gaseous material. The latter is discharged from scrubber 9 through a pipe 10 into the second stage or high-pressure side of compressor 6, wherein this material is compressed to a relatively high pressure and then discharged therefrom through a pipe 11 which leads through a temperature control device, such as controller 12, into a rectifying column 13 at one or more of the spaced points 14 which are generally located at about the central portion of column 13. The gaseous fluid discharged from the high-pressure side of compressor 6 will be heated by the compressing operation to a relatively high temperature, which temperature will depend largely upon the pressure reached in this stage of compression. Controller 12 provides a means for controlling the temperature of the fluid discharged from the high-pressure side of compressor 6 into rectifying column 13 whereby the efficiency and degree of rectification attained in column 13 may be regulated and controlled as will be more fully described hereinafter. Condensate, which may be separated from the gaseous charge as a result of the low-stage compression and cooling operations, and which may collect in scrubber 9, will be withdrawn from scrubber 9 through a pipe 15 by a pump 16 which will discharge such condensate through a pipe 17 and a valve 18 into pipe 11 where it will be mixed with the high pressure gaseous fluid passing through pipe 11 and will be discharged therewith into rectifying column 13, or, alternatively, the condensate from scrubber 9 may be discharged therefrom via a pipe 19 and valve 20 into a pipe 39 which leads to other stages of the process as will be hereinafter described in greater detail.

Instead of discharging the condensate from scrubber 9 into pipe 11, it may be discharged directly into column 13 through a pipe 106, by opening a valve 107 in pipe 106 and closing a valve 17a in pipe 17. By suitable manipulation of valves 17a and 107, the condensate from scrubber 9 may be divided, a part going into pipe 11 and the remainder into the column 13 directly through pipe 106.

The compressed gaseous fluid in pipe 11, after being subjected to temperature control by regulation in controller 12, is discharged into column 13, and is therein subjected to a controlled reflux fractionation for the purpose of separating this fluid into a liquid product containing substantially all of the desirable hydrocarbons and a gaseous product from which substantially all desirable hydrocarbons have been eliminated. Rectifying column 13 is equipped with conventional bubble plates 21 and a reboiler 22 in order to enable column 13 to perform its required functions in a highly efficient manner.

The above mentioned gaseous product, from which substantially all desirable hydrocarbons have been eliminated by the rectification operation in column 13, is discharged from the upper portion of column 13 through a pipe 23 and passes through condensers 24, wherein sufficient cooling is applied to the gaseous product to condense therefrom an adequate supply of reflux liquid for refluxing column 13 to assure substantially complete extraction and condensation, within column 13, of the desirable hydrocarbons. This reflux liquid, together with uncondensed gases, passes from condensers 24 through a pipe 25 into a reflux accumulator 26 wherein the condensed reflux liquid separates from uncondensed gases. These uncondensed gases which comprise chiefly the so-called "fixed" gases such as hydrogen, hydrogen-sulfide, methane and smaller amounts of heavier hydrocarbons, depending upon the temperature and pressure of condensation and on the degree of extraction of desired hydrocarbons, are discharged from accumulator 26 through a pipe 27, in which is mounted a valve 28, and are disposed of either as waste or are burned as fuel. The reflux liquid, which will accumulate in the lower portion of accumulator 26, is withdrawn therefrom through a pipe 29 by a pump 31 which discharges the reflux liquid through a pipe 32 into rectifying column 13 at a point therein above the top bubble plate 21. The rate of in-put of this reflux liquid of column 13 is regulated so as to obtain the desired degree of fractionation of the gaseous fluid introduced into column 13 to produce therefrom a liquid product which will contain substantially all the desirable hydrocarbons originally contained in said gaseous fluid and which will collect in the lower portion of column 13. This liquid product, which may also contain some undesirable hydrocarbons, is discharged from the lower portion of column 13 through a pipe 33 into a reboiler 22 wherein heat is applied to said liquid product to evaporate a portion of the material, the vapors returning to column 13 through pipe 34. The returned vapor hydrocarbons flow upward in column 13, and being subjected to contact with the downflowing liquid, supply the heat required to strip the undesirable hydrocarbons therefrom.

As a result of the rectification operation in the top of column 13, and the stripping operation in the lower portion of column 13, a stabilized liquid product will be produced in reboiler 22 which will contain only the desirable hydrocarbons originally contained in the gaseous fluid. The stabilized product is then discharged from reboiler 22 through a pipe 35 and a valve 36 through coolers 37 wherein the product is cooled to proper storage temperatures and from which the product then proceeds to a storage tank 38.

In the above described vapor rectification process, an important factor in determining the degree of rectification which will be attained in column 13, the pressure under which the rectification must be conducted and the quantity of reflux required for this degree of rectification, is the step of controlling the temperature of the gaseous fluid passing from the high-stage side of compressor 6 into column 13. Control of this temperature will influence both the pressure under which the rectification operation must be conducted in column 13 and also the quantity of reflux which will be required to assure the complete recovery of desirable hydrocarbons from the gaseous fluid charged to column 13.

One advantage of the above described method over prior methods, resides in utilization, in the rectification operation, of the heat imparted to the gaseous charge in the high-stage compression operation, thus reducing the amount of extraneous heat which must be supplied to column 13 for effecting the desired degree of rectification. However, the heat available from compression may be, in some cases, greater than is useful, practically, for the rectification operation, so that if the temperature of the gaseous fluid discharged from the high-stage side of compressor 6 into column 13 is not subjected to control, higher pressure and a greatly increased volume of low temperature reflux becomes necessary for obtaining the desired degree of fractionation in column 13. In other cases it may be desirable to supply additional heat to the gases, which may be accomplished by operating controller 12 as a heating device. Therefore, by providing my method of temperature control of the compressed gases entering column 13, these compressed gases may be introduced into column 13 at a temperature which will permit rectification, in every case, under the lowest required pressure and with the least volume of reflux, while at the same time utilizing all or part of the heat of compression thus providing marked economies over present processes.

In every case, the pressure required in column 13, condensers 24 and accumulator 26, should be slightly above the vapor pressure of the reflux returned to column 13 from accumulator 26, when the system is so controlled that said reflux contains practically no desirable hydrocarbons. To assure recovery of substantially all of the desirable hydrocarbons from the gaseous charge, the system should be so controlled that the composition of the reflux will, in every case, be such that it contains less than five molar percent of the desirable hydrocarbons, and, preferably, less than two molar percent.

In regulating the temperature of the gaseous fluid passing through pipe 11 into column 13, water cooling or heating, heat exchange with hotter or cooler fluids obtained from said point in the process or from extraneous sources may be used, or the desired degree of temperature control may be obtained by injecting heated or cooled gases or liquids directly into the stream of gaseous fluid flowing in pipe 11. The condensate removed from scrubber 9 through pipe 17 may be used for this purpose by providing means, such as a heat exchanger 100 arranged in a bypass pipe 101, which is equipped with valves 102 and 103 and which is connected into pipe 17, for regulating the temperature of this condensate as desired before introducing it into pipe 11.

The temperature of the gaseous fluid, introduced into column 13, is variable and will be regulated by the previously described method of control in accordance with its composition, the pressure in column 13 under which it is to be rectified, the temperature and composition of the reflux and the composition and quantity of the desirable hydrocarbons to be recovered from the gaseous fluid. In like manner, the pressures employed in the several stages of compression and the pressure maintained in column 13 must be varied to meet the specific conditions met with in each particular case. The pressure in column 13, condensers 24, accumulator 26 and the interconnecting pipes 23 and 25 is regulated by suitable manipulation of valve 28 in pipe 27. No particular temperatures and pressures may be specified because of the several variables involved, but it may be stated generally, that for any product desired, the temperature and pressure should be so regulated as to provide a sufficient quantity of reflux liquid for column 13 which will contain, as indicated above, less than five molar percent of the constituents of the final desired product.

In condensing reflux liquid from the gaseous product passing from column 13 through pipe 23, refrigeration may be utilized in condensers 24 in order to obtain reflux liquid of proper composition, not obtainable, in some cases, by cooling the gaseous product to normal temperatures.

To provide for maximum recovery of desirable hydrocarbons from the charge entering column 13, in some cases an additional step may be employed. This step consists in varying the composition of the reflux at the top of column 13 by enriching same with extraneously supplied quantities of undesirable hydrocarbons which are condensable in the column at the temperature and pressure utilized for rectification of the charge. Such additional reflux may be supplied to the upper portion of column 13 from any suitable extraneous source through a pipe 104 and a valve 105.

From the foregoing description it will be noted that in one modification of my new process, the vapor rectification and stabilization steps may be combined in a single operation, by utilizing the heat of compression of the gaseous charge to assist the rectification operation and by controlling the temperature of the compressed gaseous fluid entering the rectification step and by rectifying the fluid under suitable pressure and temperature to control the composition of the reflux used in the rectification operation, to obtain thereby maximum recovery of desirable hydrocarbons from any gaseous charge.

This particular modification of my new process is generally applicable to the recovery of useful hydrocarbons from various vapors and/or gases, particularly when the volume and composition of the gaseous charge is fairly constant. However, when the volume and composition of the gaseous charge is subject to substantial and frequent fluctuation, a second modification of my process is provided for purposes of utility under these conditions, wherein the vapor rectification and the final stabilization steps are segregated from each other. This latter modification is also useful when, due to the nature and variation of the charging stock, it is found to be uneconomical or otherwise undesirable to recover the maximum amount of desirable hydrocarbons by my first modification and, at the same time, stabilize the bottom product to definite specifications. This new modification is described in detail in the following description.

In this modification, the first or vapor rectification step is conducted in the same manner as in the previously described modification, except that no attempt is made to strip the liquid product collected in the lower portion of column 13 to the point of complete stabilization in reboiler 22 and in the lower portion of column 13. That is, in order that the load on column 13 may not be too great when peak volumes of vapors and/or gases are to be processed, the rectification of the gaseous charge and the stripping of the liquid product are so conducted as to leave appreciable quantities of undesirable hydrocarbons in the liquid product eventually withdrawn from reboiler 22, although the rectification operation is always so conducted as to eliminate substantially all desirable hydrocarbons from the gaseous product leaving column 13 as will be more fully described hereinafter.

The liquid product comprising the desirable hydrocarbons but containing some of the undesirable hydrocarbons, is withdrawn from reboiler 22 through pipe 35. Valve 36 is closed and the liquid product is then discharged through a pipe 39 by opening a valve 40 located in pipe 39. Pipe 39 leads through a cooler 41 into a surge tank 42. A valve 43 is located in pipe 39 between cooler 41 and surge tank 42 for the purpose of regulating the rate of flow of the liquid product into surge tank 42. The liquid product is cooled in cooler 41 to a temperature low enough to retain the undesirable hydrocarbons in the liquid product in liquid state and to facilitate the handling of the unstabilized liquid product by pumps.

The unstabilized liquid product in surge tank 42 is withdrawn therefrom through a pipe 46 by a pump 47 which discharges the liquid product via a pipe 48 through a heat exchanger 49, where some heat is applied to said product and thence via a pipe 50 through a pre-heater 51, wherein the final heating necessary at this point in the process for proper stabilization of the product is imparted thereto. From pre-heater 51 the now-heated unstabilized product is delivered through a pipe 52 into a stabilizer 53 at spaced points 54 located at about the middle point of stabilizer 53, which is of the conventional bubble-plate type, the bubble-plates being indicated at 55.

The heated, unstabilized liquid product thus introduced into stabilizer 53 is subjected therein to a controlled reflux fractionation operation to separate the unstabilized liquid product into a stable final liquid product comprising substantially all of the desirable hydrocarbons contained in the original gaseous charge to the process and a gaseous product containing those undesirable lighter hydrocarbons which were included in the unstabilized liquid product withdrawn from reboiler 22. This gaseous product, from which practically all desirable hydrocarbons have been eliminated by the fractionation operation conducted in stabilizer 53, is discharged from the upper portion of stabilizer 53 through a pipe 56 and a valve 57 which may be manipulated to hold any desired pressure in stabilizer 53. Pipe 56 leads through a condenser 58 into a receiver 59. Sufficient cooling is applied, in condenser 58, to the gaseous product passing therethrough, to condense a portion or all of said gaseous product. The total condensation is made possible due to the partial stabilization and elimination of the so-called "fixed" gases in column 13.

The condensate collected in receiver 59 consists of a mixture of the stabilizer reflux and a portion or all of the overhead product. Normally the undesirable hydrocarbons separated from the product in stabilizer 53 and taken overhead as a gaseous product are condensed and discharge from the stabilizer system as a waste liquid. The receiver 59 is equipped for the separation and discharge of a gaseous overhead product as an emergency measure not used in normal operation. Any gases that may collect in receiver 59 due to improper cooling in condenser 58 or for any other cause, may be discharged from the upper portion of receiver 59 through a pipe 60 in which is mounted a valve 61 which may be manipulated to control the rate of discharge of uncondensed gases from receiver 59 so as to limit the pressure of the receiver 59 to a pressure below the operating pressure of stabilizer 53. The valve 61 may also be used, in some cases, to control the pressure of the entire system including stabilizer 53 and receiver 59.

The portion of condensate used for reflux for stabilizer 53 is withdrawn from receiver 59 through a pipe 62 by a pump 63 which discharges the reflux through a pipe 64, in which is mounted a valve 65, into the upper portion of stabilizer 53 at a point above the top bubble-plate 55. Sufficient reflux is thus returned to stabilizer 53 to assure the proper degree of fractionation therein, whereby substantially all desirable hydrocarbons are eliminated from the gaseous product reaching the top of stabilizer 53. The liquid product separated from the gaseous product in stabilizer 53 is discharged from the lower portion of stabilizer 53 through a pipe 66 into a reboiler 67 where said liquid product is subjected to heating. The lighter of these hydrocarbons which are evaporated in reboiler 67 are returned via a pipe 68 to stabilizer 53 wherein they flow upward in contact with downflowing liquid transferring their heat to this liquid which acts to strip the undesirable hydrocarbons therefrom, the desirable hydrocarbons flowing back to reboiler 67. The stripped undesirable gases eventually reach the upper portion of stabilizer 53 and are mixed with the gaseous product passing therefrom through pipe 56.

The thus finally stabilized liquid product, free of substantially all undesirable hydrocarbons and comprising substantially all of the desirable hydrocarbons originally present in the gaseous charge to the process, is discharged from reboiler 67 through a pipe 69 which leads through heat exchanger 49 where it is partially cooled by heat exchange with the unstabilized liquid product passing therethrough to stabilizer 53. From heat exchanger 49 the stabilized product continues through a pipe 70 into and through a cooler 71, wherein the temperature of the stabilized product is further reduced until it attains a desired final temperature. From cooler 71 the cooled final product is discharged via a pipe 72 into tank 38 where it may be stored until it is to be used.

As mentioned above, by using the just described second modifications of my new process, there is assured an adequate supply of reflux liquid for column 13 of a composition suitable to assure substantially complete elimination of desirable hydrocarbons from the gaseous product discharged from the upper portion of column 13. This is accomplished as follows:

Due to the total condensation of the gaseous product leaving the top of stabilizer 53, a quantity of liquid in excess of the reflux requirements of stabilizer 53 is condensed. This excess reflux or condensed overhead product is split from the stream of reflux passing through pipe 64 by partially closing valve 65 and opening a valve 79 in a pipe 78 which is connected into pipe 64 between pump 63 and valve 65. By proper manipulation of valves 65 and 79, or by automatic control, the stream of reflux is divided so that enough reflux for the requirements of stabilizer 53 flows through pipe 64 into stabilizer 53, while the excess flows through pipe 78 into pipe 32 which is the pipe through which reflux from accumulator 26 is pumped to the upper portion of rectifying column 13. The reflux liquid thus obtained from receiver 59 comprises undesirable hydrocarbons separated and removed from the final product in stabilizer 53. The addition of this material to the reflux from accumulator 26 serves to increase the total quantity of reflux to and the concentration of condensable, undesirable hydrocarbons in the gaseous overhead product from column 13, which in turn effects more complete recovery of desirable hydrocarbons from the gaseous fluid charged to column 13 by reducing the proportion of desirable hydrocarbons which is retained by the gaseous overhead product.

The reflux sent back from the stabilization step to the rectification step may be, and usually is, higher in temperature than that used in column 13. To cool this reflux to the temperature required, a by-pass is arranged in pipe 78 and consists of a pipe 80 which passes through a cooler 81 before returning to pipe 78. Valves 82 and 83 are provided in pipe 80 on either side of cooler 81 and a valve 84 is placed in that portion of pipe 78 which is between the points of connection of pipe 80 to pipe 78. By suitable manipulation of valves 82, 83 and 84, part or all of the excess reflux may be by-passed through pipe 80 and cooler 81 on the way to column 13 and sufficient cooling, by any desirable means such as water cooling, heat exchange with cooler fluids or refrigeration, is applied in cooler 81 to the by-passed material so that the final temperature of the reflux which enters pipe 32 from pipe 78 will be practically the same as that of the reflux in pipe 32.

Temperatures and pressures to be used at different points in the second modification of my process are subject to variation due to the widely varying conditions met with in practice. Each set of temperature and pressure conditions will be determined by the nature of the charge material, the degree of rectification and stabilization desired, the cooling mediums available and the composition and quantity of the final product to be obtained. However, the following example of one commercial operation will serve to illustrate conditions of temperature and pressure required in processing one specific charge material for the purpose of recovering a maximum quantity of a desired product.

This particular operation was conducted at an east Texas natural gasoline plant, designed to handle 10,000,000 cubic feet of gas per day which was drawn from some 1150 wells resulting in such wide day-to-day fluctuation in the quantity and composition of the charge material as to make advisable the use of the two-step modification of my process.

A typical analysis of the gas processed appears in the following table:

| Constituent | Mol. per cent |
|---|---|
| Methane | 39.10 |
| Ethane | 13.60 |
| Propane | 28.65 |
| Iso-butane | 2.70 |
| Normal butane | 9.60 |
| Iso-pentane | 2.10 |
| Normal pentane | 2.25 |
| Hexane and heavier | 2.00 |
| Total | 100.00 |

The process was operated to recover all of the pentanes and heavier fractions together with sufficient normal butane to produce a 22 pound vapor pressure product. The residue gas leaving the plant had the following composition:

| Constituent | Mol. per cent |
|---|---|
| Methane | 48.45 |
| Ethane | 16.60 |
| Propane | 27.60 |
| Iso-butane | 2.08 |
| Normal butane | 5.27 |
| Pentanes and heavier | None |
| Total | 100.00 |

From the above analysis of the residue gas it will be evident that all of the desirable hydrocarbons comprising chiefly the pentanes and heavier fractions of the charging material have been extracted from the charge by the method of recovery described herein and remain in the recovered product of the process. The complete extraction of pentanes and heavier is accomplished at considerably less expense than is possible by processes used heretofore and in fact, such complete recovery of these fractions has been considered commercially impractical by processes used heretofore.

The conditions under which the above operation was conducted, using the numbers applied to the particular parts of the apparatus in the drawing to represent the same parts in the commercial installation, are as follows:

| Pressures | Pounds per square inch |
|---|---|
| Low-stage side of compressor 6 | 40 |
| Rectifying column 13, condesnsers 24, accumulator 26 | 250 |
| Stabilizer 53, condenser 58, receiver 59 | 150 |

| Temperatures | Degrees F. |
|---|---|
| Gas leaving scrubber 9 | 95 |
| Gas leaving high-stage side of compressor 6 | 180 |
| Gas leaving controller 12 and entering column 13 | 130 |
| Reflux liquid from accumulator 26 to column 13 | 90 |
| Unstabilized product entering stabilizer 53 | 160 |
| Top of stabilizer 53 | 130 |
| Reflux liquid from receiver 59 to stabilizer 53 | 90 |

The 22 pound vapor pressure product produced under the above conditions contained about 45% of the normal butane available in the charging stock. By changing the conditions of operation, the process may be varied to eliminate all of the butanes from the final product or to include all of the butanes as may be desired. Similarly, any of the other fractions may be included or eliminated, but, in every case, by means of my new process, it is possible and economically practical to include substantially all of any desired fraction of the charge in the final product, while preventing loss of any substantial portion thereof in the waste gases from the process.

It will be obvious to those skilled in the art, that various changes may be made in the details disclosed, without departing from the spirit of the invention. For example, if it is desired to obtain more than one product from the process, such as a product comprising the pentane and heavier fractions and a second product comprising the butane fraction, the recovery operation may be conducted in accordance with either of the above described modifications to recover, from the original charge, a first liquid product which will contain substantially all of the butane and heavier fractions. Then, by providing additional and suitable fractionating apparatus, such as will be evident to experts in the art, this first liquid product may be further fractionated to sharply separate the butane fraction from the pentane and heavier fractions and these fractions will then be separately recovered from the process.

In the modifications of my new process, as described above, the original gaseous charge is subjected to two stage compression. It will be obvious that compression may take place in more than two stages or even in a single stage. Where more than two stages of compression are used, with cooling between the stages and separation of condensates after each cooling stage, these condensates may all be mixed together and introduced into the first or the second rectification zone, or some of the condensates may be introduced into the first rectification zone and some into the second. Of course, when only one rectification column is used, then all of the condensates will be introduced in this column together with the uncondensed portion of the charge leaving the final stage of compression.

In using the two-step, or second modification of my new process, it will be found desirable, in practically all cases, to operate the second, or stabilizing column under lower pressure than that under which the first, or rectification column, is operated. In the example given above, the difference in pressure is about 100 pounds. In other cases the difference in pressure may be greater or less than 100 pounds, this difference in pressure not being critical but variable depending on the particular conditions met with in practice.

What I claim and desire to secure by Letters Patent is:

1. The method of recovering desirable hydrocarbons from a gaseous charge containing said hydrocarbons which comprises, compressing said charge, subjecting the resulting compressed fluid to a rectifying step conducted under pressure to rectify said fluid and to recover therefrom said desirable hydrocarbons and changing the composition of the normal reflux made in said rectifying step and used therein by adding thereto undesirable lighter hydrocarbons, and thereby reducing the amount of desirable hydrocarbons that would otherwise be present in the normal reflux.

2. The method of recovering desirable hydrocarbons from a gaseous charge containing said hydrocarbons which comprises, compressing said charge, subjecting the resulting compressed fluid to a rectifying step conducted under pressure to rectify said fluid and to recover therefrom said desirable hydrocarbons and changing the composition of the normal reflux made in said rectifying step and used therein by adding thereto undesirable hydrocarbons lighter than said desirable hydrocarbons but which are condensable under the temperature and pressure in the rectifying step, and thereby reducing the amount of desirable hydrocarbons that would otherwise be present in the normal reflux.

3. The method of recovering desirable hydrocarbons from a gaseous charge containing said hydrocarbons which comprises, subjecting said charge to a compression step wherein said charge is compressed and heated by compression, subjecting the resulting heated and compressed fluid to a rectifying step conducted under pressure to rectify said fluid and to recover therefrom said desirable hydrocarbons, controlling the temperature of said fluid prior to subjecting same to said rectifying step, and changing the composition of the normal reflux made in said rectifying step and used therein by adding thereto undesirable lighter hydrocarbons, and thereby reducing the amount of desirable hydrocarbons that would otherwise be present in the normal reflux.

4. The method of recovering desirable hydrocarbons from a gaseous charge containing said hydrocarbons which comprises, subjecting said charge to a compression step wherein said charge is compressed and heated by compression, subjecting the resulting heated and compressed fluid to a rectifying step conducted under pressure to rectify said fluid and to recover therefrom said desirable hydrocarbons, controlling the temperature of said fluid prior to subjecting same to said rectifying step, and changing the composition of the normal reflux made in said rectifying step and used therein by adding thereto undesirable hydrocarbons lighter than said desirable hydrocarbons but which are condensable at the temperature and pressure of said rectifying step, and thereby reducing the amount of desirable hydrocarbons that would otherwise be present in the normal reflux.

5. The method of recovering desirable hydrocarbons from a gaseous charge containing said hydrocarbons together with undesirable lighter hydrocarbons which comprises, subjecting said charge to compression whereby said charge is compressed and heated, subjecting the resulting heated and compressed fluid to rectification in two rectification stages to separate said fluid into a stabilized fraction containing said desirable hydrocarbons which is withdrawn from the second of said rectification stages and a fraction consisting substantially only of said undesirable lighter hydrocarbons which is also withdrawn from said second rectification stage, adding a portion of the latter fraction to the normal reflux made in said first rectification stage and used therein to thereby reduce the amount of desirable hydrocarbons that would otherwise be present in said normal reflux, and discharging substantially all of said undesirable lighter hydrocarbons contained in said charge from said first rectification stage.

6. The method of recovering desirable hydrocarbons from a gaseous charge containing said hydrocarbons together with undesirable lighter hydrocarbons which comprises, subjecting said charge to compression whereby said charge is compressed and heated, subjecting the resulting heated and compressed fluid to regulated temperature control, thereafter subjecting said fluid to rectification in two rectification stages to separate said fluid into a stabilized fraction containing said desirable hydrocarbons which is withdrawn from the second of said rectification stages and a fraction consisting substantially only of said undesirable lighter hydrocarbons which is also withdrawn from said second rectification stage, adding a portion of the latter fraction to the normal reflux made in the first rectification stage and used therein to thereby reduce the amount of desirable hydrocarbons that would otherwise be present in said normal reflux, and discharging substantially all of said undesirable lighter hydrocarbons contained in said charge from said first rectification stage.

7. The method of recovering desirable hydrocarbons from a gaseous charge containing said hydrocarbons together with undesirable lighter hydrocarbons which comprises, subjecting said charge to stage compression whereby said charge is compressed and heated by compression, subjecting the resulting heated and compressed fluid to regulated temperature control, thereafter introducing said fluid into a first rectification zone, therein rectifying said fluid to recover therefrom a first product containing said desirable hydrocarbons together with some of said undesirable lighter hydrocabons, introducing said first product into a second rectification zone, therein rectifying said first product to separate same into a stabilized final product containing substantially all of said desirable hydrocarbons and a gaseous material consisting substantially only of undesirable hydrocarbons, withdrawing said stabilized final product from the process, condensing said gaseous material and adding the resulting condensate to the normal reflux made in said first rectification zone and used therein to thereby reduce the amount of desirable hydrocarbons that would otherwise be present in said normal reflux.

8. The method of recovering desirable hydrocarbons from a gaseous charge containing said hydrocarbons together with undesirable lighter hydrocarbons which comprises, subjecting said charge to compression and cooling in a plurality of stages at progressively increasing pressures with separation of condensates from uncondensed portions of said charge after each of said stages except the final one, subjecting the compressed fluid from the final stage to regulated temperature control, thereafter introducing said fluid into a first rectification zone, therein rectifying said fluid to recover therefrom a first product containing said desirable hydrocarbons together with some of said undesirable lighter hydrocarbons, discharging said first product from said first rectification zone, mixing said first product with said condensates, introducing the resulting mixture into a second rectification zone, therein rectifying said mixture to separate same into a final liquid product containing substantially all of said desirable hydrocarbons and a gaseous material containing undesirable lighter hydrocarbons, discharging the final product from the process, cooling said gaseous material to produce therefrom a reflux condensate and introducing a portion of said reflux condensate into said first rectification zone.

9. The method of recovering desirable hydrocarbons from a gaseous charge containing said hydrocarbons together with undesirable lighter hydrocarbons which comprises, subjecting said charge to compression and cooling in a plurality of stages at progressively increasing pressures with separation of condensates from uncondensed portions of said charge after each of said stages except the final one, subjecting the compressed fluid from said final stage to regulated temperature control, introducing said fluid into a first rectification zone, therein rectifying said fluid to recover therefrom a first product containing said desirable hydrocarbons together with some of said undesirable lighter hydrocarbons, discharging said first product from said first rectification zone, mixing said first product with said condensates, introducing the resulting mixture into a second rectification zone, therein rectifying said mixture to separate same into a final liquid product containing substantially all of said desirable hydrocarbons and a gaseous material containing undesirable hydrocarbons, discharging said final product from the process, cooling said gaseous material to produce therefrom a reflux condensate, returning a portion of said reflux condensate to said second rectification zone and introducing the remainder thereof into said first rectification zone.

10. The method of recovering desirable hydrocarbons from a gaseous charge containing said hydrocarbons together with undesirable lighter hydrocarbons which comprises, subjecting said charge to stage compression whereby said charge is heated, subjecting the resulting heated and compressed fluid to temperature control by regulating cooling, thereafter introducing said fluid into a first rectification zone, therein rectifying said fluid to recover therefrom a first product containing said desirable hydrocarbons together with some of said undesirable lighter hydrocarbons, introducing said first product into a second rectification zone, therein rectifying said first product to separate same into a stabilized final product containing substantially all of said desirable hydrocarbons and a gaseous material consisting substantially only of undesirable hydrocarbons, withdrawing said final product from the process, condensing said gaseous material and adding a portion of the resulting condensate to the normal reflux made in said first rectification zone and used therein to thereby reduce the amount of desirable hydrocarbons that would otherwise be present in said normal reflux.

11. The method of recovering desirable hydrocarbons from a gaseous charge containing said hydrocarbons together with undesirable lighter hydrocarbons which comprises, subjecting said charge to compression whereby said charge is compressed and heated, subjecting the resulting compressed and heated fluid to regulated temperature control, introducing said fluid into a first rectification zone, therein rectifying said fluid to recover therefrom a first liquid product containing said desirable hydrocarbons together with some of said undesirable lighter hydrocarbons, discharging said first product from said first rectification zone and introducing same into a second rectification zone, therein rectifying said first product to separate same into a final liquid product containing substantially all of said desirable hydrocarbons and a gaseous material consisting substantially only of undesirable hydrocarbons, discharging said final product from the process, cooling said gaseous material to produce therefrom a reflux condensate, returning a portion of said reflux condensate to said second rectification zone, further cooling the remainder of said reflux condensate and adding said remainder to the normal reflux made in said first rectification zone and used therein to thereby reduce the amount of desirable hydrocarbons that would otherwise be present in said normal reflux.

12. The method of recovering desirable hydrocarbons from a gaseous charge containing said hydrocarbons, which comprises compressing said charge, subjecting the resulting compressed fluid to a rectifying step conducted under pressure to rectify said fluid and to recover therefrom said desirable hydrocarbons, and changing the composition of the normal reflux made in said rectifying step and used therein by adding thereto a gaseous material consisting substantially only of undesirable hydrocarbons lighter than said desirable hydrocarbons, and thereby reducing the amount of desirable hydrocarbons that would otherwise be present in the normal reflux.

13. The method of recovering desirable hydrocarbons from a gaseous charge containing said hydrocarbons which comprises, compressing said charge, subjecting the entire resulting compressed fluid to a rectifying step conducted under pressure in a single rectifying zone, therein rectifying said fluid to separate same into a liquid product comprising said desirable hydrocarbons which is withdrawn from the lower portion of said zone and a gaseous fraction comprising undesirable hydrocarbons which is withdrawn from the upper portion of said zone, and changing the composition of the normal reflux made in said rectifying zone and used therein by adding thereto from an extraneous source undesirable hydrocarbons lighter than said desirable hydrocarbons, and thereby reducing the amount of desirable hydrocarbons that would otherwise be present in the normal reflux.

14. The method of recovering desirable hydrocarbons from a gaseous charge containing said hydrocarbons which comprises, compressing said charge, subjecting the resulting compressed fluid to a rectifying step conducted under pressure to rectify said fluid and to recover therefrom said desirable hydrocarbons and changing the composition of the normal reflux made in said rectifying step and used therein by adding thereto from an extraneous source undesirable hydrocarbons lighter than said desirable hydrocarbons and condensable under the temperature and pressure in the rectifying step, and thereby reducing the amount of desirable hydrocarbons that would otherwise be present in the normal reflux.

PAUL M. RAIGORODSKY.